(12) United States Patent
Beynet et al.

(10) Patent No.: US 12,042,953 B2
(45) Date of Patent: Jul. 23, 2024

(54) METHOD FOR PRODUCING A COUNTER-FORM AND METHOD FOR MANUFACTURING A PART HAVING A COMPLEX SHAPE USING SUCH A COUNTER-FORM

(71) Applicant: NORIMAT, Toulouse Occitaine (FR)

(72) Inventors: Yannick Beynet, Toulouse Occitaine (FR); Romain Epherre, Toulouse Occitaine (FR)

(73) Assignee: NORIMAT, Toulouse Occitaine (FR)

( * ) Notice: Subject to any disclaimer, the term of this patent is extended or adjusted under 35 U.S.C. 154(b) by 676 days.

(21) Appl. No.: 17/281,386

(22) PCT Filed: Oct. 1, 2019

(86) PCT No.: PCT/EP2019/076605
§ 371 (c)(1),
(2) Date: Mar. 30, 2021

(87) PCT Pub. No.: WO2020/070713
PCT Pub. Date: Apr. 9, 2020

(65) Prior Publication Data
US 2022/0032498 A1    Feb. 3, 2022

(30) Foreign Application Priority Data
Oct. 2, 2018   (FR) ...................... 1859120

(51) Int. Cl.
*B29C 33/56*    (2006.01)
*B22F 3/10*    (2006.01)
(Continued)

(52) U.S. Cl.
CPC ............ *B28B 1/001* (2013.01); *B22F 3/1021* (2013.01); *B22F 3/15* (2013.01); *B28B 7/346* (2013.01);
(Continued)

(58) Field of Classification Search
CPC .............. B22F 3/105; B22F 2003/1051; B22F 3/1258; B28B 1/001; B28B 7/346;
(Continued)

(56) References Cited

U.S. PATENT DOCUMENTS 5,211,786 A * 5/1993 Enloe .................... C04B 35/645
264/338 X
5,658,334 A * 8/1997 Caldarise .............. B29C 64/165
623/923
(Continued)

FOREIGN PATENT DOCUMENTS

EP    2551040        1/2013
EP    3301597 A1 *  4/2018   ......... B29C 33/3835
(Continued)

*Primary Examiner* — Leo B Tentoni
(74) *Attorney, Agent, or Firm* — Defillo & Associates, Inc; Evelyn A. Defillo

(57) ABSTRACT

A method for producing a counter-form (20) for manufacturing a part having a complex shape (24) by pressure sintering densification. The counter-form (20) is formed from successive layers produced by numerically-controlled three-dimensional (3D) additive printing according to the following steps: numerically recording a three-dimensional negative of the part to be produced (24) in a control unit of a three-dimensional additive printing system in order to constitute the positive form of the counter-form to be produced; producing the counter-form (20) using a 3D additive printing technique. The part having a complex shape (24*d*) is then manufactured by pressure sintering, then separated from the counter-form which is also sintered (20).

17 Claims, 3 Drawing Sheets

(51) Int. Cl.

| | | |
|---|---|---|
| *B22F 3/15* | (2006.01) | |
| *B28B 1/00* | (2006.01) | |
| *B28B 7/34* | (2006.01) | |
| *B29C 33/38* | (2006.01) | |
| *B29C 33/58* | (2006.01) | |
| *B29C 33/60* | (2006.01) | |
| *B29C 33/68* | (2006.01) | |
| *B29C 37/00* | (2006.01) | |
| *B29C 64/112* | (2017.01) | |
| *B29C 64/118* | (2017.01) | |
| *B29C 64/124* | (2017.01) | |
| *B29C 64/141* | (2017.01) | |
| *B29C 64/153* | (2017.01) | |
| *B29C 64/165* | (2017.01) | |
| *B29C 64/386* | (2017.01) | |
| *B33Y 10/00* | (2015.01) | |
| *B33Y 50/00* | (2015.01) | |
| *B33Y 80/00* | (2015.01) | |
| *C04B 35/645* | (2006.01) | |
| *B22F 10/14* | (2021.01) | |

(52) U.S. Cl.
CPC ...... *B29C 33/3835* (2013.01); *B29C 33/3842* (2013.01); *B29C 37/005* (2013.01); *B33Y 10/00* (2014.12); *B33Y 80/00* (2014.12); *C04B 35/645* (2013.01); *B22F 10/14* (2021.01); *C04B 2235/3222* (2013.01); *C04B 2235/3246* (2013.01); *C04B 2235/3248* (2013.01); *C04B 2235/3418* (2013.01); *C04B 2235/3427* (2013.01); *C04B 2235/6026* (2013.01); *C04B 2235/6562* (2013.01); *C04B 2235/666* (2013.01)

(58) Field of Classification Search
CPC . B29C 33/3835; B29C 33/3842; B29C 33/56; B29C 33/58; B29C 33/60; B29C 33/68; B29C 37/005; B29C 64/112; B29C 64/118; B29C 64/124; B29C 64/141; B29C 64/153; B29C 64/165; B29C 64/386; B33Y 10/00; B33Y 50/00; C04B 35/645; C04B 2235/6026; C04B 2235/6562; C04B 2235/666
USPC ....... 264/113, 219, 220, 225, 308, 313, 316, 264/334, 337, 338, 401, 434, 656, 657, 264/681; 219/149; 419/48, 52
See application file for complete search history.

(56) References Cited

U.S. PATENT DOCUMENTS

| | | | |
|---|---|---|---|
| 2004/0231822 A1* | 11/2004 | Frasier | B29C 64/165 164/122.2 |
| 2012/0094214 A1* | 4/2012 | Zahid | C04B 35/645 264/681 X |
| 2012/0310364 A1* | 12/2012 | Li | B29C 64/386 264/220 |
| 2014/0014639 A1* | 1/2014 | Couret | C04B 35/645 219/149 |
| 2016/0144432 A1 | 5/2016 | Clark | |
| 2017/0291221 A1 | 10/2017 | Swank | |
| 2017/0361490 A1 | 12/2017 | Henry | |
| 2017/0368780 A1 | 12/2017 | Middlemiss | |

FOREIGN PATENT DOCUMENTS

| | | |
|---|---|---|
| FR | 3042992 | 5/2017 |
| WO | WO2016030654 | 3/2016 |

\* cited by examiner

2a

2b

2c 2d 2e

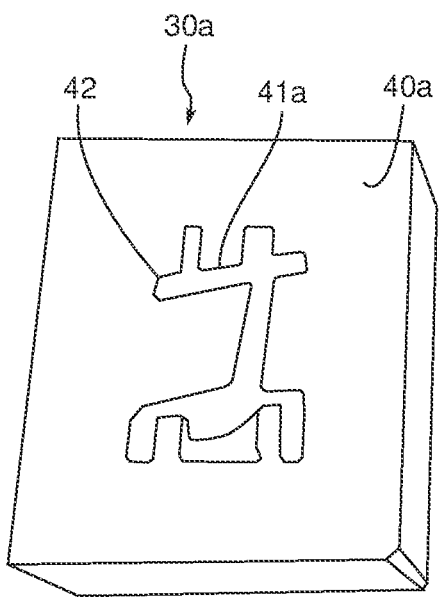 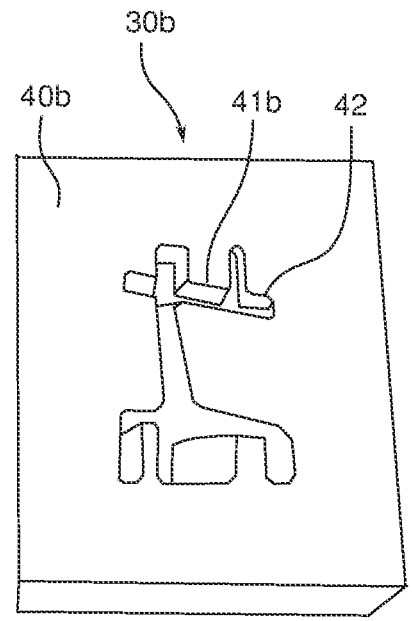
Fig.3a                                   Fig.3b
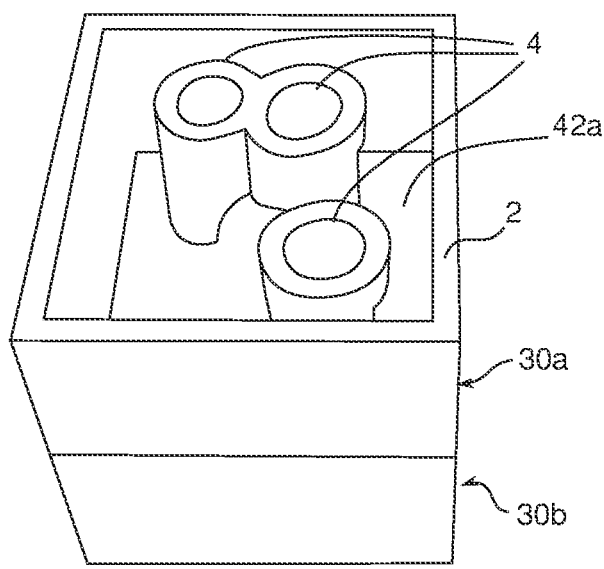 
Fig.3c                                   Fig.4

METHOD FOR PRODUCING A COUNTER-FORM AND METHOD FOR MANUFACTURING A PART HAVING A COMPLEX SHAPE USING SUCH A COUNTER-FORM

CROSS REFERENCE TO RELATED APPLICATION

This application is a national stage entry of PCT/EP2019/076605 filed Oct. 1, 2019, under the International Convention and claiming priority over French Patent Application No. 1859120 filed Oct. 2, 2018.

TECHNICAL FIELD

The invention relates to a method for producing a counterform intended for manufacturing parts of complex shape, and to a method for manufacturing a part of complex shape by means of pressure sintering using such a counterform.

The invention relates to the field of manufacturing parts, in particular industrial mechanical parts, by densifying porous or pulverulent materials. This field covers various techniques for densification by means of sintering under uni- or multiaxial, isostatic load, for example hot, in particular isostatic, pressing, high-pressure spark sintering known as SPS (spark plasma sintering), or selective laser sintering.

More particularly, the SPS sintering technique consists in consolidating a volume of ceramic, polymer or metal powders in a conductive mold in order to rapidly obtain finely microstructured dense materials. This consolidation is achieved by means of the simultaneous application of a load (under a high uniaxial pressure exerted on the mold, for example of the order of 100 MPa) and heating, of the order of 500° C. to 2000° C., provided by a high-intensity pulsed direct current in the mold (for example of the order of 500 to 10000 A), the total sintering of the powders then being obtained in only a few minutes.

The main advantage of this SPS sintering technique is that, given the high rate of temperature rise and the relatively short residence times at high temperature, the densification of the material is accompanied with no, or very little, crystal growth.

PRIOR ART

The uniaxial pressure exerted by the SPS sintering technique has the drawback of causing heterogeneity of densification, in particular for parts of complex shapes having substantial differences in thickness leading to a removal of material that is non-uniform, with respect to the limited space and time, between the regions of different thicknesses. In general, a complex shape refers to a shape of variable curvature with or without variation in thickness, or with a great variation in thickness with or without variation in curvature, and/or with geometric break.

In order to overcome this drawback of inhomogeneity of densification, patent document FR 3 042 992 provides for adding a deformable interface layer between the pulverulent (or porous) material and the counterform face of the mold tailored for producing the part.

However, sintering techniques also have a problem related to the use of molds or mold counterforms which do not allow easy removal from the mold when the part has a complex shape, in particular forming undercuts which are difficult to access and, therefore, tapers which are difficult to remove from the mold without partially destroying the part.

Counterforms may be impressions obtained by pressing a bed of ceramic powder agglomerated by a binder or by binding ceramic powder on a polymer preform, the counterform being covered with an inert interface. These techniques also have substantial limitations with regard to accessible geometries, due to the problems of undercuts of complex shapes, and of the surface state of these counterforms which requires covering by an interface.

In order to produce counterforms compatible with tapers that can be removed from the mold, it is then necessary to multiply the number of counterforms in order to avoid problems of removal from the mold. The tools tailored for each counterform then need to be manufactured, resulting in additional design and machining steps. The assembly of these many counterforms is also a source of defects (mismatched geometry of the final part, incipient cracks, loss of material, etc.).

Also known, from document US 2017/291221, is the use of a thin-walled container produced by additive printing according to the shape of the part to be manufactured. The container is integrated into an HIP (hot isostatic pressing)-technology press in order to densify the powdered metal. Document US 2017/368780 uses additive printing of a plurality of materials in an HIP press in order to confer particular properties on the part according to the direction.

In document EP 2 551 040, which again relates to HIP technology, the material of the container, previously made in additive layers, is the same as that of the component to be manufactured. Other documents, US 2017/361490, US 2016/144432 or US 2016/030654 use additional phases for the implementation of HIP technology: a phase of gelation, or the use of ceramic molds made previously by means of a wax-based method with HIP technology.

However, these documents implement HIP technology, which technology involves the use of oversized, complex and time-consuming means.

SUMMARY OF THE INVENTION

The invention aims to overcome this problem, in particular it aims to avoid the development of a specialized tool for producing the counterform and to facilitate the joining of the counterform portions, while controlling the surface state of the counterforms. To that end, the invention provides in particular for the use of a counterform of which the structure results from a digitally controlled additive technique and for sizing the counterform in order to anticipate a contraction of the material to be densified along the axis along which the pressure is exerted.

More specifically, one subject of the present invention is a method for producing a counterform for manufacturing a part of complex shape by means of pressure sintering densification. In this method, the counterform is formed of successive layers deposited by means of digitally controlled three-dimensional (3D) additive printing according to the following steps:

digitally modeling a three-dimensional negative of the part to be produced in a control unit of a three-dimensional additive printing system in order to make a print of the counterform to be produced, the rest of the counterform having faces of suitable shape for a mold for manufacturing the part;

producing the counterform by means of a 3D additive printing technique, the size of the counterform being increased by a density stretch factor that compensates for a shrinkage in the size of the part to be manufactured (1; 24d) in the direction of the pressure applied during the sintering densification of the part to be manufactured; and completing the additive printing of the counterform (20; 30a, 30b) by sintering.

In particular, the combination of the features of increased counterform size and of prior sintering makes it possible to provide adaptation—by adaptation during the sinterings of the counterform and subsequently of the material of the part to be manufactured, which leads to rigorous application of the target degree of densification for this material, and results in the acquisition of physico-chemical characteristics—with the acquisition of higher homogeneity of porosity and the predetermined porosity fraction of the part to be manufactured—and of precisely obtained geometric features (dimensions and configuration).

According to some advantageous implementations:
the 3D additive printing technique may be chosen from stereolithography, binder jetting, controlled extrusion, fused filament fabrication, inkjet printing and aerosol jet printing;
the porous material used to produce the counterform is chosen from a ceramic, a silica, a metal silicate and a composite material;
the printing is performed with a thickness of the walls of the counterform that is less than or equal to five millimeters, in order to avoid any cracking during the subsequent sinterings of the part;
said counterform is, in a subsequent step, divided into at least two portions that are joined along at least one joint plane so as to eliminate at least one undercut, the joint plane between the portions separating the complex shape into portions that can be removed from the mold directly.

A step of removing the binder from the counterform may advantageously be performed at the output of the 3D additive printing by means of a heat treatment at temperatures of between 200 and 600° C. and rates of temperature rise of between 0.1 and 1° C./min, depending on the material of the counterform. This step makes it possible to remove the organic compounds introduced into the material during the production of the counterform.

In addition, the step of binder removal may be followed by a step of pre-sintering which consists in heat-treating the counterform at higher temperatures, of between 600 and 1500° C. depending on the material of the counterform, this step making it possible to start the densification of the counterform, giving it mechanical strength and promoting the application of the interface.

Another subject of the invention is a method for manufacturing a part of complex shape by means of pressure sintering using a counterform produced by means of the method as defined above, the method for manufacturing a part being carried out according to the following steps:
bringing the counterform portions together in a densification mold for pressure sintering;
introducing a pulverulent material to be densified into at least one duct that passes through a counterform portion;
densifying said material to be densified by means of sintering under uniaxial pressure; and
separating the counterform portions in order to release the part thus manufactured.

The porous or pulverulent material of the part to be manufactured may be chosen from a ceramic, a metal alloy, a polymer and a composite material. In addition, at least one of the outer walls of the counterform portion may be voided and then filled with ceramic powder of which the sintering temperature is equivalent to that of the ceramic of the counterform portion.

According to some preferred features:
the material of the counterform is chosen so that the materials of the counterform and of the part to be manufactured exhibit the same behavior on sintering, this identical behavior resulting from the prior sintering of the materials of the counterform;
the sintering start temperature, or sintering end temperature, of a ceramic of the counterform is higher than or equal to, or higher than, respectively, that of the part to be manufactured;
the ceramic may be chosen from powdered YSZ (yttria-stabilized zirconia), ATZ (alumina-toughened zirconia), ZTA (zirconia-toughened alumina) and alumina exhibiting degrees of densification that may range from 40 to 80%;
at least one open-ended duct is provided outside the counterform, in order to fill the counterform with a pulverulent or porous material intended for forming the part, and to remove any excess powder;
the additive printing of the counterform is completed by sintering of the counterform, this sintering potentially being applied at the same time as the sintering of the part to be manufactured.

According to one advantageous embodiment, provision is made to arrange a layer of porous and/or pulverulent material as an interface between the counterform and the material to be densified. This separating interface makes it possible to prevent any interaction between the counterform and the powder of the part to be obtained.

Advantageously, the interface is formed by at least one layer of material chosen from graphite, an yttrium oxide and boron nitride. The interface layer may be applied in a form chosen from a spray, a powder deposit and a sheet of suitable shape.

PRESENTATION OF THE FIGURES

Further information, features and advantages of the present invention will become apparent from reading the following non-limiting description given with reference to the attached figures which show, respectively:

FIG. 1b shows a digital model of a three-dimensional negative of the part to be produced of FIG. 1a;

FIG. 3a shows a from view of a counterform produced in the context of manufacturing the part of FIGS. 1a and 1b;

FIG. 3b shows affront view of another counterform produced in the context of manufacturing the part of FIGS. 1a and 1b;

FIG. 3c showsa front view of the two counterforms of FIG. 3a-3b brought together in a mold for densification by SPS pressure sintering; and FIG. 4, a perspective view of the manufactured part.

In the figures, identical elements are identified by the same reference sign which refers to the one or more passages of the description in which it is mentioned.

DETAILED DESCRIPTION

Figure 1A:
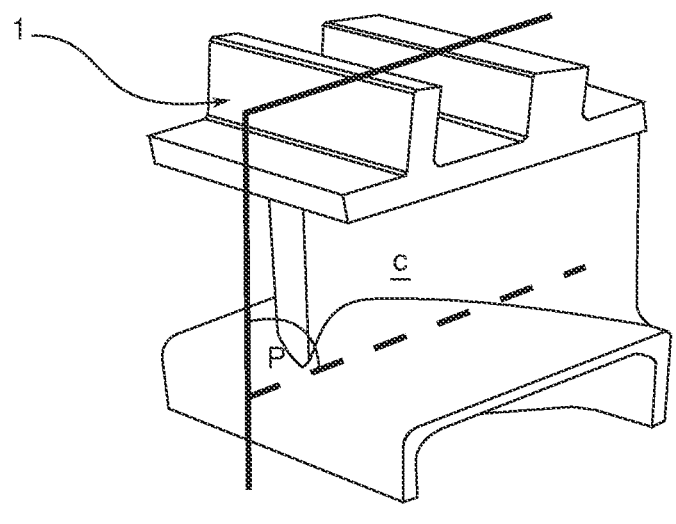
FIG. 1a shows an exemplary part of complex shape to be produced according to the method of the invention.
Figure 1A:
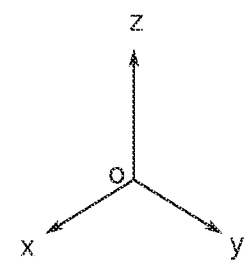

With reference to FIG. 1a, an exemplary part 1 of complex shape to be produced according to the manufacturing method of the invention is presented. The plane "P"—parallel to the reference plane XOZ) is the joint plane of two counterforms to be produced beforehand (as will be explained below) in order to allow easy removal of the part from the mold once produced: specifically, the part 1 has in particular a recess "C" forming an undercut, which makes removal from the mold difficult. According to the invention, the recess "C" is then entirely on the side of one counterform.

Figure 1B:
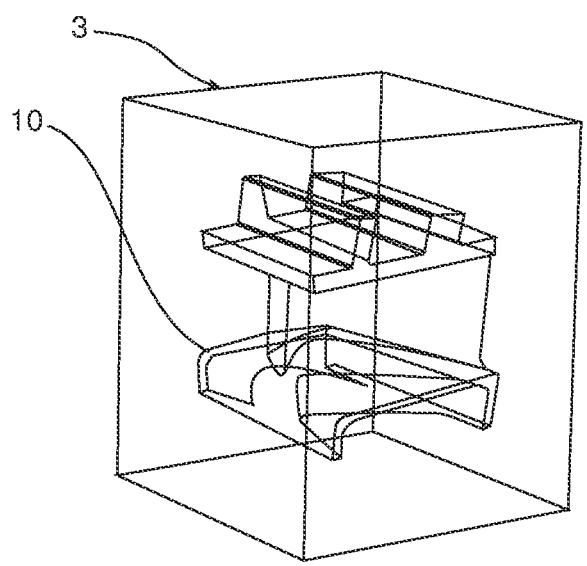
Figure 1B:
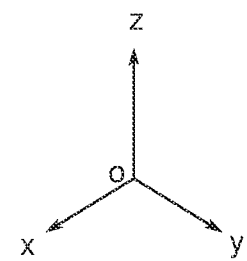

FIG. 1b shows a digital model 3 of the three-dimensional negative 10 of the part 1 of FIG. 1a. This digital model 3 is produced in a control unit of a three-dimensional additive printing system (not shown), in order to make the positive form of the portions of the counterform to be produced. For ease of removal from the mold, this positive form is divided into two portions, as shown in FIG. 1a. The subsequent step is the production of each counterform portion by means of a 3D additive printing technique, stereolithography in the example, the result being presented with reference to FIG. 3 with the two counterform portions 30a and 30b.

Figure 2:
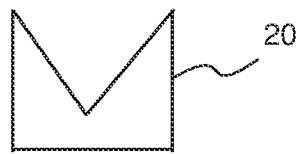
FIG. 2 shows schematic views in section of the main steps 2a to 2e of the method for manufacturing a part of complex shape according to the invention by means of sintering using a counterform produced by means of the method according to the invention.
Figure 2:
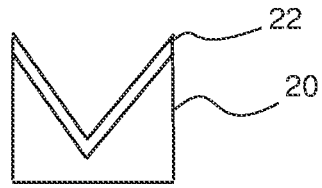
Figure 2:
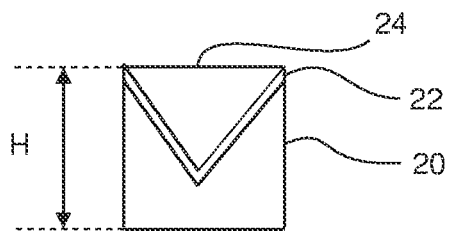
Figure 2:
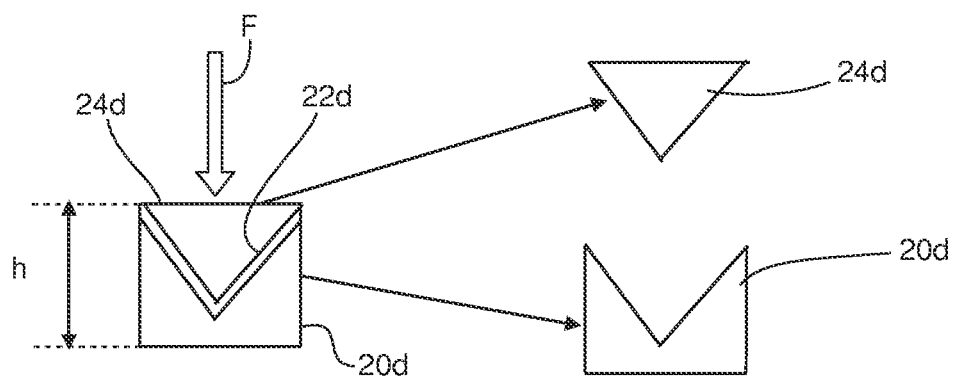

FIG. 2 shows schematic views in section of the means implemented in the main steps 2a to 2e of the method according to the invention for manufacturing a part of complex shape 24d by means of sintering under uniaxial pressure, this method using a counterform 20 produced (step 2a) according to the invention by means of a 3D additive printing technique, stereolithography in the example, from bound ceramic powder.

In the case illustrated, a single dihedral counterform suffices for easy removal from the mold of the prismatic part 24d (cf. step 2e) of which the shape is considered to be complex in this simplified example. A graphite interface layer 22 of constant thickness is then deposited on the counterform 20 (step 2b) by spraying, and then the material to be densified 24 is added onto this interface 22 (step 2c). This interface 22 serves to prevent interaction between the counterform 20 and the powder 24 of the part to be manufactured.

The materials to be densified used in the example for manufacturing the part are metal alloys, a TiAl alloy (titanium and aluminum alloy) and a nickel-based superalloy in the Rene family.

Advantageously, the material of the counterform 20 is chosen so that the materials of the counterform and of the part to be manufactured 24 have similar behavior on sintering, in terms of sintering start and end temperatures and of degree of densification.

In the case of the alloys used for the part to be manufactured, the ceramic used for the counterform is then ATZ (alumina-toughened zirconia) for a part made of TiAl, and YSZ (yttria-stabilized zirconia) for the nickel-based superalloy selected from the Rene family. More generally, the sintering start temperature (or sintering end temperature) of the ceramic used for the counterform is higher than or equal to (or higher than, respectively) that of the metal alloy of the part to be manufactured.

SPS sintering under uniaxial pressure of the material to be densified 24 also densifies the counterform 20 in this example (envisaging shrinkage of −10% to −45%), the material 24 and the counterform 20 being introduced into an SPS mold (not shown).

In envisaging this densification, the size of each counterform portion 20 is increased in order to anticipate the shrinkage of the part 24 in the direction of SPS sintering with the uniaxial pressure "F" exerted (step 2d). The geometry of the part 24 is thus "stretched" beforehand by a stretch factor "Fe" in order to compensate for this shrinkage in size of the part. The factor Fe is defined by the ratio of the density of the powder to be densified to the density of the densified powder. Advantageously, the simplified geometry of the counterform portions 20 may easily change in the case of a change in the value of the factor Fe.

Thus, in this exemplary embodiment, the uniaxial pressure "F" results in a decrease in the maximum height of the counterform 20 by 40%, this height going from a value "H" (step 2c) to a value "h" (step 2d). This decrease in height allows the part 24d to be manufactured with the intended height, the initial height "H" having been increased by applying the coefficient Fe. The condensed counterform and part, referenced 20d and 24d, are then easily separated (step 2e).

The views of FIGS. 3a and 3b present a counterform made of ATZ ceramic in the form of portions 30a and 30b, in the context of the example of manufacturing the part 1 made of TiAl according to FIGS. 1a and 1b, the ATZ ceramic and the TiAl alloy having similar behaviors on sintering. These counterform portions 30a and 30b have joining faces 40a and 40b in the joint plane "P" (cf. FIG. 1a).

Advantageously, removal of the binder from the counterform portions 30a, 30b is implemented by a heat treatment at temperatures of between 200 and 600° C., 400° C. in the example, with a rate of temperature rise of between 0.1 and 1° C./min, 0.5° C./min in the example. This step makes it possible to remove the organic compounds which may be introduced into the ceramic powder during the 3D printing for producing the counterform portions.

Preferably, pre-sintering is also performed after removal of the binder. This pre-sintering consists in treating the counterform portions with binder removed 30a, 30b at even higher temperatures, for example between 600° C. and 1500° C. depending on the materials used, at 1200° C. in the example. This heat treatment makes it possible to start the densification of the counterform portions in order to give them mechanical strength and thus facilitate the application of the one or more interface layers, as described below.

The two half-impressions 41a and 41b of the part to be manufactured are covered with graphite 42 by spraying, and then with a layer based on yttrium oxide in order to prevent reaction between the ceramic and the material of the part to be manufactured, TiAl in the example. For the production of the counterform by means of stereolithography, the counterform divided into two portions allows unpolymerized paste to be removed. Additionally, the counterform portions 30a, 30b advantageously have a maximum thickness of 5 mm in order to avoid any risk of cracking during the sintering and the heat treatment for binder removal when recovering the part.

With reference to FIG. 3c, the two counterform portions 30a, 30b are joined together in an SPS sintering mold 2 so that the two half-impressions 41a, 41b form a single impression corresponding, in negative, to the part to be manufactured. The filling of this impression with TiAl powder is performed via the three hollow ducts 4. These ducts 4 pass through the face 42a opposite the joint face 40a of the counterform portion 30a (cf. FIG. 3a). The ducts 4 also allow any excess TiAl powder to be removed as necessary.

The outer walls of one or more counterform portions 30a, 30b may advantageously be voided, in order to facilitate their production by 3D printing. These voided spaces are then filled with YSZ (yttria-stabilized zirconia) powder which has a sintering temperature equivalent to that of the ATZ counterform ceramic used.

During the SPS sintering under uniaxial pressure, the ceramic and the metal alloy of the part to be manufactured will sinter simultaneously, the sintered ceramic covering the metal part. By virtue of the interface layers of graphite and of yttrium oxide 42 (cf. FIGS. 3a and 3b), the ceramic is easily separated from the part by freeing it mechanically and/or chemically. FIG. 4 illustrates the final part 1 obtained with some ceramic residues 43 still to be removed.

The invention is not limited to the exemplary embodiments described and shown. Thus, the counterform may be divided into a minimum number of portions in order to avoid undercuts in the part to be manufactured.

Furthermore, the counterform may be structured with localized regions of weakness without site restriction, in order to facilitate final removal from the mold.

Additionally, the part to be manufactured may be formed of a metal alloy powder, a ceramic, a composite material or any type of suitable material.

The invention claimed is:

1. A method for producing a counterform (20, 30a, 30b) for manufacturing a part of complex shape (1; 24d) by pressure sintering densification, the counterform (20; 30a, 30b) is formed of successive layers produced by digitally controlled three-dimensional (3D) additive printing, the method comprising the following steps:
digitally recording a three-dimensional negative (3) of the part to be produced (1; 24d) in a control unit of a three-dimensional additive printing system in order to make a print of the counterform (20; 30, 30b) to be produced, the rest of the counterform having faces of suitable shape for a mold for manufacturing the part (1; 24d);
producing the counterform (30a, 30b) by means of a 3D additive printing technique, the size of the counterform (20; 30a, 30b) being increased by a density stretch factor that compensates for a shrinkage in the size of the part to be manufactured (1; 24d) in the direction of the uniaxial pressure (F) applied during the sintering densification of the part to be manufactured;
completing the additive printing of the counterform (20; 30a, 30b) by sintering; and
wherein the counterform (20; 30a, 30b) is produced from a porous material chosen so that the materials of the counterform (20; 30a, 30b) and of the part to be manufactured (1; 24d) exhibit the same behavior on sintering.

2. The method for producing a counterform as claimed in claim 1, wherein the 3D additive printing technique is chosen from stereolithography, binder jetting, controlled extrusion, fused filament fabrication, inkjet printing, or aerosol jet printing.

3. The method for producing a counterform as claimed in claim 1, wherein the counterform (20; 30a, 30b) is produced from a porous material chosen from a ceramic, a silica, a metal silicate, or a composite material.

4. The method for producing a counterform as claimed in claim 1, wherein the printing is performed with a thickness of the walls of the counterform (20; 30a, 30b) that is less than or equal to five millimeters.

5. The method for producing a counterform (20, 30a, 30b) as claimed in claim 1, further including a step of removing a binder from the counterform (30a, 30b) at the output of the 3D additive printing by a heat treatment at a temperature of between 200 and 600° C. and rates of temperature rise of between 0.1 and 1° C./min.

6. The method for producing a counterform as claimed in claim 5, wherein the step of binder removal is followed by a step of pre-sintering by heat-treating the counterform (3a, 30b) at a temperature of between 600 and 1500° C.

7. The method for producing a counterform as claimed in claim 1, wherein said counterform is, in a subsequent step, divided into at least two portions (30a, 30b) that are joined along at least one joint plane (P) so as to eliminate at least one undercut, the joint plane (P) between the portions (30a, 30b) separating the complex shape into portions (30a, 30b) that are removed from the mold directly.

8. A method for manufacturing a part of complex shape (1; 24d) by sintering using a counterform (20; 30a, 30b) produced by the method according to claim 7, wherein the method includes the following steps:
bringing the counterform portions (20, 30a, 30b) together in a densification mold for sintering under uniaxial pressure;
introducing a pulverulent or porous material to be densified into at least one duct (4) that passes through a counterform portion (30a);
densifying the pulverulent or porous material for sintering under uniaxial pressure (F); and
separating the counterform portions (30a, 30b) to release the part (1; 24d) thus manufactured.

9. The manufacturing method as claimed in claim 8, wherein:
the sintering start temperature of a ceramic of the counterform (20; 30a, 30b) is higher than or equal to the sintering start temperature of the part to be manufactured (1; 24d); and
the sintering start temperature of a ceramic of the counterform (20; 30a, 30b) is higher than the sintering start temperature of the part to be manufactured (1; 24d).

10. The manufacturing method as claimed in claim 9, wherein the ceramic is chosen from YSZ, ATZ, ZTA and alumina powder exhibiting degrees of densification that range from 40 to 80%.

11. The manufacturing method as claimed in claim 8, wherein at least one open-ended duct (4) for filling with a pulverulent or porous material intended for forming the part (1; 24d) is provided outside the counterform (20; 30a, 30b).

12. The manufacturing method as claimed in claim 8, wherein the sintering of the counterform (20; 30a, 30b) is applied at the same time as the sintering of the part to be manufactured (1; 24d).

13. The manufacturing method as claimed in claim 8, wherein the porous or pulverulent material of the part be manufactured (1; 24d) is chosen from a ceramic, a metal alloy, a polymer, or a composite material.

14. The manufacturing method as claimed in claim 13, wherein at least one of the outer walls of the counterform portion (30a, 30b) is voided and then filled with ceramic powder of which the sintering temperature is equal to that of the ceramic of the counterform portion (30a, 30b).

15. The manufacturing method as claimed in claim 8, wherein an interface of porous or pulverulent material (22; 42) is arranged between the counterform (20; 30a, 30b) and the material to be densified (24).

16. The manufacturing method as claimed in claim 15, wherein the interface (22; 42) is formed by at least one layer of material chosen from graphite, an yttrium oxide and boron nitride.

17. The manufacturing method as claimed in claim 16, wherein the interface layer (22; 42) is applied in a form chosen from a spray, a powder deposit, or a sheet of suitable shape.

* * * * *